US012212573B2

(12) United States Patent
Shyamala et al.

(10) Patent No.: US 12,212,573 B2
(45) Date of Patent: Jan. 28, 2025

(54) AUTHORIZATION LEVEL UNLOCK FOR MATCHING AUTHORIZATION CATEGORIES

(71) Applicant: Capital One Services, LLC, McLean, VA (US)

(72) Inventors: Geeta Shyamala, Herndon, VA (US); Lee Adcock, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 210 days.

(21) Appl. No.: 17/809,923

(22) Filed: Jun. 30, 2022

(65) Prior Publication Data

US 2024/0007472 A1   Jan. 4, 2024

(51) Int. Cl.
*G06F 15/16* (2006.01)
*G06F 21/62* (2013.01)
*H04L 9/40* (2022.01)

(52) U.S. Cl.
CPC ........ *H04L 63/102* (2013.01); *G06F 21/6227* (2013.01); *G06F 21/6245* (2013.01); *H04L 63/0807* (2013.01); *H04L 63/105* (2013.01)

(58) Field of Classification Search
CPC . H04L 63/102; H04L 63/0807; H04L 63/105; G06F 21/6227; G06F 21/6245
See application file for complete search history.

(56) References Cited

U.S. PATENT DOCUMENTS

| | | | | |
|---|---|---|---|---|
| 10,154,410 | B2* | 12/2018 | Jakobsson | H04L 63/08 |
| 12,074,885 | B2* | 8/2024 | Han | H04L 63/105 |
| 2008/0148351 | A1* | 6/2008 | Bhatia | G06F 21/6218 |
| | | | | 726/2 |
| 2008/0162338 | A1* | 7/2008 | Samuels | G06F 21/40 |
| | | | | 705/42 |
| 2017/0094517 | A1* | 3/2017 | Jakobsson | G06F 21/31 |
| 2019/0005751 | A1* | 1/2019 | Warren | H04W 12/06 |
| 2020/0026829 | A1* | 1/2020 | Ehrlich | G07C 9/257 |
| 2023/0179998 | A1* | 6/2023 | McCracken, Jr. | H04W 12/06 |
| | | | | 726/6 |
| 2023/0328058 | A1* | 10/2023 | Polasa | H04L 63/126 |
| | | | | 726/4 |

\* cited by examiner

*Primary Examiner* — Oleg Survillo
(74) *Attorney, Agent, or Firm* — Foley & Lardner LLP

(57) ABSTRACT

Methods and systems are described herein for bypassing secondary tiers of authentication for particular security categories. An authentication system, when authenticating a user, may receive an authentication request with authentication data enabling authentication through a multi-tier authentication mechanism. When the request has been authenticated through a multi-tier authentication mechanism, the authentication system may identify a category associated with the request and generate a temporal unlock flag for that category of future requests, such that the temporal unlock flag indicates that multi-tier authentication is not required for a predetermined amount of time for requests of that category. The temporal unlock flag may be inserted into the user's record. When future requests of that same category are received, only a single-tier authentication mechanism may be required for authentication.

20 Claims, 6 Drawing Sheets

| User ID 203 | Authentication Requirements 206 | Temporal Unlock Flags 209 |
|---|---|---|
| 1 | Authentication Mechanism 1<br>Authentication Mechanism 2 | Category 1:Time 1 |
| 2 | Authentication Mechanism 1<br>Authentication Mechanism 2 | None |
| 3 | Authentication Mechanism 1<br>Authentication Mechanism 3 | Category 1: Time: 1<br>Category 2: Time 2 |

| Entity ID | Parameter 1 | Type | Categories |
|---|---|---|---|
| 1 | Location_1 | Type_1 | Category_1 Category_2 |
| 2 | Location_2 | Type_2 | Category_1 |
| 3 | Location_3 | Type_3 | Category_3 |

FIG. 3

| Category ID | Unlock Duration | Category Definition |
|---|---|---|
| 1 | 5 hours | Definition_1 |
| 2 | 24 hours | Definition_2 |
| 3 | .1 hours | Definition_3 |

AUTHORIZATION LEVEL UNLOCK FOR MATCHING AUTHORIZATION CATEGORIES

BACKGROUND

User authentication has become a ubiquitous part of people's lives. User authentication is performed by many systems, including systems for smartphone access, office access, and financial account access, among others. For example, if a particular enterprise desires to keep non-employees out of its offices, that enterprise may enable electronic door locks that may be opened with a security key/card programmed specifically for each user. Going even further, some authentication systems require two tiers of authentication. For example, to access a particular area within an office, a user may be required to have a key/card and may also be required to perform retina authentication. In another example, a user trying to access a user account may be required to have a card/fob for accessing that account and may be required to perform fingerprint authentication. Although multi-tier authentication enables more secure access, it may be burdensome in many circumstances. For example, when a user comes to work (e.g., in an office), the user may need to get through a number of doors to get to the user's office. The user may need to get through different doors to access different areas of a building. For example, the user may need to access a first door to enter the building, a second door to enter the correct floor, a third door to enter an office, and a fourth door to enter, for example, a cafeteria for lunch. Having to provide multi-level authentication for each of these doors may be inconvenient. At the same time, bypassing multi-level authentication everywhere (e.g., for all doors) may make the authentication process less secure.

SUMMARY

Accordingly, methods and systems are described herein for bypassing secondary authentication for particular security categories. An authentication system, when authenticating a user, may receive an authentication request with authentication data enabling authentication through a multi-tier authentication mechanism. When the request has been authenticated through a multi-tier authentication mechanism, the authentication system may identify a category associated with the request and generate a temporal unlock flag for that category of future requests, such that the temporal unlock flag indicates that multi-tier authentication is not required for a predetermined amount of time for requests of that category. The authentication system may then insert the temporal unlock flag into a record associated with the user. Thus, when future requests of that same category are received for that user, only single-tier authentication may be required.

In some embodiments, the mechanism for bypassing secondary authentication for particular security categories may involve the following operations. An authentication system may receive a first request for a first database operation. The first request may include first authentication data for a user and an indication of a first category. For example, a user may desire to go to his/her place of work. To get into his/her office, the user may need to access three different doors (e.g., a first door to access the building, a second door to access the floor, and a third door to access the office). Thus, when the user arrives at the building, the user may scan, through a scanning device, an identification card/fob that identifies the user, and the user may also perform retina authentication (e.g., perform a retina scan) or another secondary authentication. The resulting data may be packaged as authentication data and sent as a first request to the authentication system. The authentication system may receive the request and determine a category for that request.

The authentication system may then authenticate, based on the first authentication data, the first request using a first authentication mechanism and a second authentication mechanism. For example, the first authentication mechanism may include determining whether the card/fob is valid, and the second mechanism may determine whether the retina scan matches the same user as the card/fob. When the authentication is successful, the authentication system may perform the first database operation (e.g., open the door by updating a value within the database).

Based on authenticating the first request, the authentication system may insert a temporal unlock flag for the first category into a user record. The temporal unlock flag may indicate that the second authentication mechanism is not required for a predetermined amount of time for requests associated with the first category. For example, the category of the request may be "office access." Thus, the system may generate an unlock flag for the "office access" category for a period of time such as, for example, fifteen minutes, allowing the user to return to his/her office without having to perform a retina scan again. The temporal unlock flag may be inserted into the user record so that the authentication system may check for that flag when the user scans his/her card/fob through another door.

In some embodiments, the authentication system may determine a time based on the category. Thus, each category may have an associated time. For example, if the category is "lunchroom access," the authentication system may enable bypassing secondary authentication for one and a half hours so that the user is able to eat lunch and come back to his/her office without having to perform retina authentication on the way back from the lunchroom. However, the bypassing secondary authentication may only be performed for access points/doors that are between the lunchroom and the user's office. That is, in this instance, secondary authentication would not be bypassed for any and all access points/doors. The bypass would be dynamic and precise so that the user is able to get back to the user's office without having to do secondary authentication again. However, if the user decides to deviate from the path (e.g., go visit a colleague in another part of the building), secondary authentication may still be enabled for other access points/doors.

Thus, when the authentication system receives a second request for a second database operation, the authentication system may use the second request to determine an associated category. For example, the authentication system may determine from which access door the second request originated and determine, based on that information, a category of that request. That is, if the second request originated from an access door on the path to the user's office (e.g., has a category of "office access"), the authentication system may identify that category. Based on determining that the second request is associated with the first category and the temporal unlock flag is set, the authentication system may bypass the second authentication mechanism for the second request. For example, the authentication system may determine that the access door is on the way to the user's office (e.g., has a category of "office access") and, as a result, not require secondary authentication (e.g., not require a retina scan). In some embodiments, any access door in the office may require a two-step authentication process. The first step may require a card/fob swipe. When the card/fob swipe is determined valid, the authentication system may move to step two, where a retina authentication is required (e.g., a retina device is enabled). Thus, in these embodiments, retina authentication may be bypassed for access doors within the "office access" category for a particular amount of time.

When the request has been authenticated, the authentication system may execute the second request (e.g., the database operation) to open the second door without requiring the second authentication mechanism (e.g., a retina scan). After the predetermined amount of time has passed, the authentication system may remove the temporal unlock flag from the user's record so that the user will need to undergo multi-tier authentication again. For example, the authentication system may be designed to allow bypassing of secondary authentication for office access for fifteen minutes, because it may take a user a maximum of fifteen minutes to access his/her office after being authenticated within the building (e.g., at the building's access door). After that time, the multi-tier authentication may be enabled again to boost security.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION OF THE DRAWINGS

FIG. 2 illustrates an excerpt of a data structure representing user records with temporal unlock flags, in accordance with one or more embodiments of this disclosure.

FIG. 3 illustrates an excerpt of a data structure representing entities with corresponding categories, in accordance with one or more embodiments.

FIG. 4 illustrates an excerpt of a data structure representing categories and associated predetermined amounts of time, in accordance with one or more embodiments.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
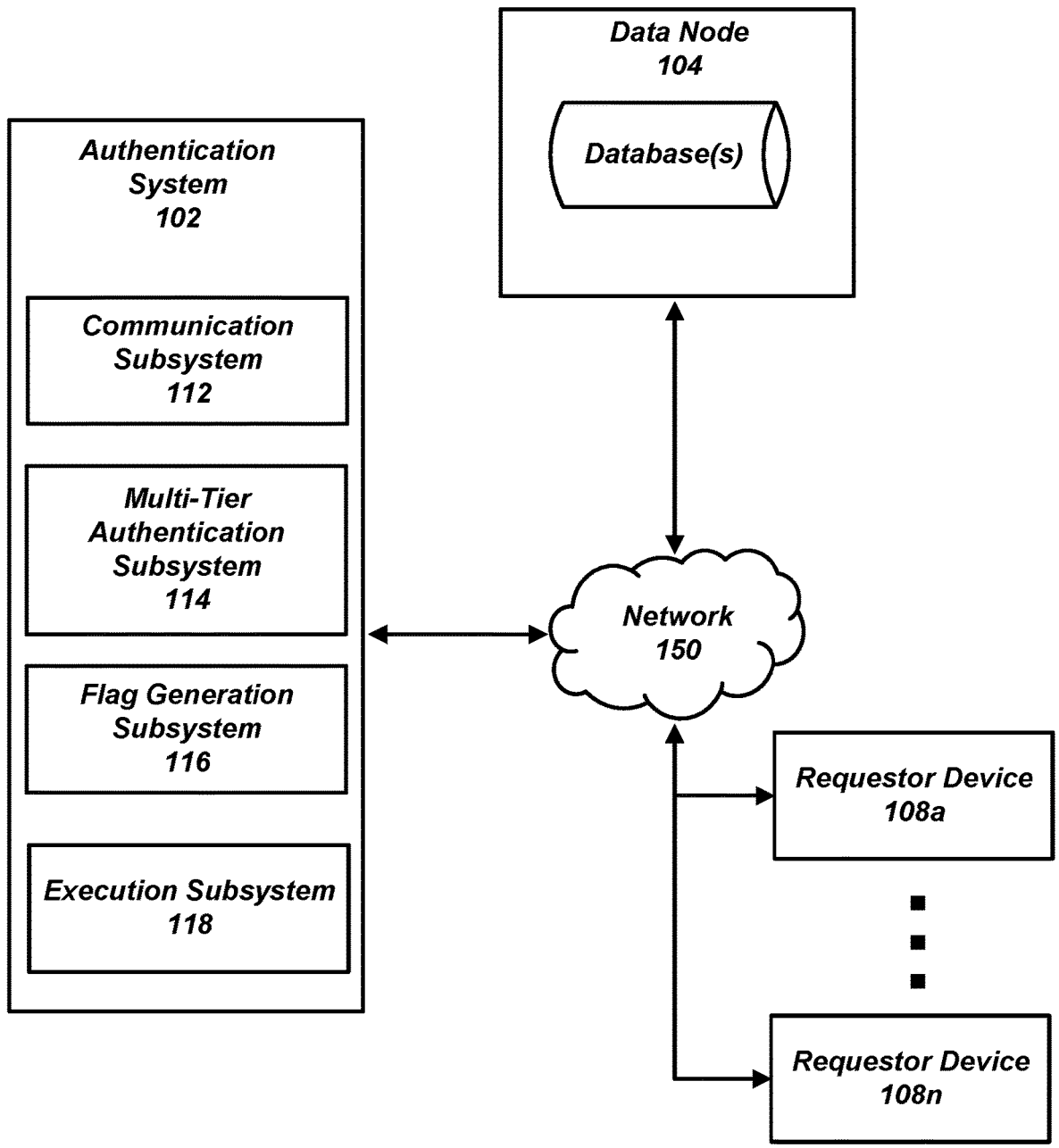
FIG. 1 shows an illustrative system for bypassing secondary authentication for particular security categories, in accordance with one or more embodiments of this disclosure.

FIG. 1 shows environment 100, which includes a system for bypassing secondary authentication for particular security categories. Environment 100 includes authentication system 102, data node 104, and requestor devices 108a-108n. Authentication system 102 may execute instructions for bypassing secondary authentication for particular security categories. Authentication system 102 may include software, hardware, or a combination of the two. For example, authentication system 102 may reside on a physical server, or on a virtual server that is running on a physical computer system and may include software instructions that use components of that server (e.g., memory, processor, storage, etc.).

Data node 104 may store various data, including category information, user data, entity data, etc. In some embodiments, data node 104 may reside on the same hardware as authentication system 102. Data node 104 may include software, hardware, or a combination of the two. For example, data node 104 may be a physical server, or a virtual server that is running on a physical computer system. Network 150 may be a local area network, a wide area network (e.g., the Internet), or a combination of the two. Requestor devices 108a-108n may be end-user computing devices (e.g., door access computing devices with card/fob and/or retina/fingerprint scanners, electronic tablets, smartphones, point of sale systems, and/or other computing devices).

Authentication system 102 may receive a first request for a first database operation, the first request including first authentication data for a user and an indication of a first category. Authentication system 102 may receive the first request using communication subsystem 112. Communication subsystem 112 may include software components, hardware components, or a combination of both. For example, communication subsystem 112 may include a network card (e.g., a wireless network card and/or a wired network card) that is coupled with software to drive the card.

In some embodiments, the first request may be a request to open an access door. For example, a user may swipe a key card/fob and perform a retina scan. The data generated based on those actions may be encoded into the first request. In addition, access door data may be added to the first request. In some embodiments, the access door data may include an identifier associated with the access door and when the authentication system receives the identifier, the authentication system may perform a lookup for one or more categories associated with the particular access door. In this case, the database operation may be a database transaction that inserts a flag into a database to open the access door.

In some embodiments, the disclosed authentication system may be used in a financial context. For example, the first request may be a request for a financial transaction such as a credit card purchase or a debit card purchase. Thus, a user may scan a credit/debit card at a point of sale terminal or insert the credit card into a reader. In addition, the credit/debit card may be equipped with a fingerprint scanner or a retina scanner. Thus, the user may perform the scan prior to inserting the card into the scanner. The biometric information and the credit card chip authentication may be packaged into the first request. In addition, merchant information (e.g., a merchant identifier) may be added to the first request. In some embodiments, the merchant information may include one or more categories associated with the merchant. In some embodiments, however, the merchant information may include a merchant identifier, and authentication system 102 may perform a database lookup for the merchant based on the merchant identifier and extract from an associated database record one or more categories associated with the merchant. In this instance, the database operation may be an update to a database record indicating a transaction (e.g., inserting a database record for the transaction).

When the first request is received, communication subsystem 112 may pass the first request to multi-tier authentication subsystem 114. Multi-tier authentication subsystem 114 may include software components, hardware components, or a combination of both. For example, multi-tier authentication subsystem 114 may include software components that access authentication data in memory and/or storage and hardware components (e.g., one or more processors) to perform operations.

When multi-tier authentication subsystem 114 receives the first request, multi-tier authentication subsystem 114 may authenticate, based on the first authentication data, the first request using a first authentication mechanism and a second authentication mechanism. In some embodiments, the authentication process may be performed by identifying a user associated with the first request and an entity associated with the first request, and then determining whether any temporal unlock flags associated with the user correspond to any categories associated with the entity identified within the request.

For example, upon receiving the first request, multi-tier authentication subsystem 114 may identify a user (e.g., based on an associated user identifier) associated with the first request and, based on the identity of the user, determine whether the user has any associated temporal unlock flags and for which categories. FIG. 2 illustrates an excerpt of a data structure 200 representing user records with temporal unlock flags. Field 203 may store a user identifier. The user identifier may be a numeric value, an alphanumeric value, a string, or another suitable value. Thus, multi-tier authentication subsystem 114 may search field 203 of data structure 200 for a matching user identifier. When multi-tier authentication subsystem 114 locates a record associated with the user identifier, multi-tier authentication subsystem 114 may determine whether there are any temporal unlock flags associated with the user and, if so, a category for each temporal unlock flag. Field 209 may store any temporal unlock flags active for the user and any corresponding categories. If there are no temporal unlock flags for the user in field 209 (e.g., as illustrated by entry 212), multi-tier authentication subsystem 114 may proceed to determine which authentication mechanisms are to be used for authenticating the user. Field 206 may store authentication mechanisms for each user. Thus, multi-tier authentication subsystem 114 may extract the authentication mechanisms and perform authentication. In some embodiments, multi-tier authentication subsystem 114 may determine which authentication mechanisms to use for each request based on the data within the request (e.g., metadata indicating which authentication types are being used). Multi-tier authentication subsystem 114 may use multiple authentication mechanisms to authenticate the user.

In some embodiments, the first authentication data may include a first authentication token and a second authentication token. For example, the first authentication token may be an authentication token generated by a processor on the key card/fob. Thus, the first authentication token may be authenticated by the system to confirm that the key card/fob is authentic. Thus, if the first authentication token is authenticated, multi-tier authentication subsystem 114 may determine that the first authentication mechanism has successfully authenticated the user. The second authentication token may be generated by a fingerprint scanner and may include fingerprint data provided by the user. The fingerprint data may be compared with the fingerprint data for the user within a database to determine whether the data matches. If the data matches, then the multi-tier authentication subsystem 114 may determine that the second authentication mechanism has authenticated the fingerprint data successfully.

In some embodiments, the first database operation may be an action related to a first entity record within a database. The first entity record may include a field indicating the first category. FIG. 3 illustrates an excerpt of a data structure 300 representing entities with corresponding categories. Field 303 may include an entity identifier. The entity identifier may be a numeric value, an alphanumeric value, a string, and/or another suitable value. Field 306 may include one or more parameters associated with each identifier. For example, if each entity is an access door, field 306 may store a value indicating a location of each access door. In another example, if each entity is a merchant (e.g., a merchant associated with a transaction that is being performed), field 306 may include a location of the merchant (e.g., an address or another suitable location identifier). Field 309 may include a type of entity. For example, a type of access door may be external, internal, etc.

In another example, a type of merchant may be food, electronics, services, etc. Field 312 may include one or more categories associated with the entity. For example, a category for each access door may be based on zones. Thus, if a user on the way to his/her office needs to access particular doors, each of those doors may have a zone. In another example, a category may be something that groups merchants together. For example, all merchants in a theme park may have an associated category representing the theme park. In some embodiments, categories may be generated from parameters (e.g., from a location, type, etc.). Accordingly, if the entity record represents an access door, the database operation or action in relation to the entity may be opening the access door associated with the entity record. Furthermore, if the entity record represents a merchant, the database operation or action in relation to the entity may be performing a transaction involving that merchant. Accordingly, bypassing secondary authentication may only be performed for merchants that match the category (e.g., located within a particular area such as an amusement park, having a particular type. That is, in this instance, secondary authentication would not be bypassed for any and all merchants. The bypass would be dynamic and precise so that the user is able to easily transact with merchants of a particular category without secondary authentication. However, if the user decides to transact with a merchant that does not match (e.g., perform a transacation outside the amusement park that is unrelated to the category), secondary authentication may still be enabled for those other merchants.

In a financial transaction scenario, multi-tier authentication subsystem 114 may, for example, receive a request for a credit card purchase. The request may include both chip authentication (e.g., from a processor on a credit card) and fingerprint authentication provided by the user. Multi-tier authentication subsystem 114 may then use the first authentication mechanism (e.g., chip authentication) to authenticate the card and identify an account associated with the card, and may then use the second authentication mechanism (e.g., fingerprint authentication) to authenticate fingerprint data received as part of the first request.

In some embodiments, multi-tier authentication subsystem 114 may work in a slightly different manner. For example, multi-tier authentication subsystem 114 may receive a first request with authentication information for a first authentication mechanism (e.g., keycard/fob scan). Multi-tier authentication subsystem 114 may authenticate, based on authentication data, the first request using the first authentication mechanism. Multi-tier authentication subsystem 114 may then request (e.g., via communication subsystem 112) a second tier of authentication (e.g., fingerprint scan, retina scan, etc.). Upon receiving the second-tier authentication data (e.g., a second authentication token), multi-tier authentication subsystem 114 may authenticate the second-tier authentication information using the second authentication mechanism. Multi-tier authentication subsystem 114 may then pass an indication of successful authentication and one or more categories (e.g., category identifiers) associated with the first request to flag generation subsystem 116.

Flag generation subsystem 116 may include software components, hardware components, or a combination of both. For example, flag generation subsystem 116 may include software components. Flag generation subsystem 116 may access data in memory and/or storage and may use one or more processors to perform its operations. Based on authenticating the first request, flag generation subsystem 116 may insert a temporal unlock flag for the first category into a user record. The temporal unlock flag may indicate that the second authentication mechanism is not required for a predetermined amount of time for requests associated with the first category.

Flag generation subsystem 116 may generate the temporal unlock flag based on the first category. For example, flag generation subsystem 116 may receive one or more category identifiers associated with the request. Based on the one or more category identifiers, flag generation subsystem 116 may generate one or more temporal unlock flags. In some embodiments, flag generation subsystem 116 may determine a time period for each temporal unlock flag based on a corresponding category. FIG. 4 illustrates an excerpt of a data structure 400 representing categories and associated predetermined amounts of time. Field 403 may store a category identifier. The category identifier may be a numeric value, an alphanumeric value, a string, or another suitable value. Field 406 may store unlock durations for each category, and field 409 may store definitions for each category. Thus, flag generation subsystem 116 may use the one or more category identifiers to perform a lookup for the corresponding amount(s) of time. Based on the determined amount(s) of time, flag generation subsystem 116 may generate one or more temporal unlock flags. Each temporal unlock flag may include an indication of the category (e.g., a category identifier or another suitable indicator), a time when the temporal unlock flag expires, and/or other suitable information.

Accordingly, in some embodiments, flag generation subsystem 116 may perform the following operations when inserting the temporal unlock flag for the first category into the user record. Flag generation subsystem 116 may retrieve, from a category repository, metadata associated with the first category. As discussed in relation to FIG. 4, flag generation subsystem 116 may perform a lookup of a record associated with the first category. Flag generation subsystem 116 may use a category identifier and submit the category identifier to a database engine with a lookup request. Based on the lookup request, the database engine may return an unlock duration (e.g., field 406) for the corresponding category identifier.

Flag generation subsystem 116 may then determine the predetermined amount of time based on the metadata associated with the first category. Thus, flag generation subsystem 116 may retrieve the unlock duration (e.g., from field 406). Flag generation subsystem 116 may then generate the temporal unlock flag that includes the first category and a value indicating when the predetermined amount of time ends (e.g., expiration time). For example, flag generation subsystem 116 may generate a data structure that includes a category identifier and the expiration time. Based on the predetermined amount of time, flag generation subsystem 116 may calculate an end time for the temporal unlock flag and insert that value into the user record (e.g., a user record as illustrated in FIG. 2). As discussed above, flag generation subsystem 116 may generate multiple temporal unlock flags (e.g., one flag per category). In some embodiments, flag generation subsystem 116 may generate a single temporal unlock flag for all categories with corresponding amounts of time.

Authentication system 102 may then receive a second request for a second database operation, the second request including second authentication data for the user. As discussed above, authentication system 102 may receive the second request using communication subsystem 112. Communication subsystem 112 may pass the second request to multi-tier authentication subsystem 114. Multi-tier authentication subsystem 114 may receive the request and identify a user associated with the request. As discussed above, multi-tier authentication subsystem 114 may identify the user based on authentication data within the request (e.g., based on a user identifier as illustrated in FIG. 2) and retrieve a record associated with the user (e.g., a database record). Based on a record (e.g., field 209 of FIG. 2), multi-tier authentication subsystem 114 may identify one or more categories and one or more expiration times associated with corresponding amounts of time for the record.

In addition, multi-tier authentication subsystem 114 may identify one or more categories corresponding to an entity associated with the request. For example, the second request may include an entity identifier (e.g., as illustrated in FIG. 3). Multi-tier authentication subsystem 114 may perform a lookup (e.g., using the entity identifier) and retrieve an associated record. Based on the record, multi-tier authentication subsystem 114 may determine one or more categories associated with the entity. Multi-tier authentication subsystem 114 may then compare the one or more categories in the temporal unlock flag with the one or more categories associated with the entity. If there is a category match for at least one category, multi-tier authentication subsystem 114 may determine that the entity should be treated under the temporal unlock flag. Although these operations are described in relation to a second request, these same operations may be performed in relation to the first request.

To continue with the access door example above, the user may swipe a keycard/fob to access an access door. Authentication system 102 may receive a request for access and determine whether the user has a temporal unlock flag for a category (e.g., a particular zone) that matches a category associated with that particular access door. If at least one category matches, authentication system 102 may determine that the request is associated with the category for which a temporal unlock flag exists. In another example, if the second request is a transaction request to purchase a good or service from a merchant (e.g., using a credit card or a debit card), authentication system 102 may determine whether a temporal unlock flag within the user record has a category that matches a category associated with a merchant. If at least one category matches, authentication system 102 may determine that the request is associated with the category for which a temporal unlock flag exists.

Based on determining that the second request is associated with the first category and the temporal unlock flag is set, authentication system 102 bypasses the second authentication mechanism for the second request. As discussed above, authentication system 102 may bypass the second authentication mechanism by performing the following operations. These operations may be performed by multi-tier authentication subsystem 114. Thus, multi-tier authentication subsystem 114 may extract a user record identifier and an entity record identifier from the second request. As discussed above, the user record identifier may correspond to a user identifier illustrated in field 203 of FIG. 2, and an entity record identifier may correspond to an entity identifier as illustrated in field 303 of FIG. 3.

Multi-tier authentication subsystem 114 may retrieve an entity category from an entity record corresponding to the entity record identifier. For example, multi-tier authentication subsystem 114 may retrieve a record corresponding to a particular entity and extract one or more categories (e.g., from field 312 of FIG. 3) for the particular entity. In addition, multi-tier authentication subsystem 114 may retrieve from the user record, and based on the user record identifier, one or more categories with associated unlock flags. As discussed above, multi-tier authentication subsystem 114 may perform a lookup, using a user identifier (e.g., a user identifier as illustrated in field 203 of FIG. 2), to retrieve a record associated with the user. Multi-tier authentication subsystem 114 may extract from the record one or more temporal unlock flags within the user record and determine one or more categories based on those temporal unlock flags (e.g., as illustrated by field 209 of FIG. 2).

Based on determining that the entity category matches a category of the one or more categories with the associated unlock flags, multi-tier authentication subsystem 114 may authenticate the second request using the first authentication mechanism without using the second authentication mechanism. For example, multi-tier authentication subsystem 114 may cause an access door to be opened with just a keycard/fob swipe without requiring retina and/or fingerprint authentication. In another example, multi-tier authentication subsystem 114 may cause a transaction to be authenticated and processed with just a transaction card (e.g., credit or debit card) swipe without requiring fingerprint authentication. Thus, multi-tier authentication subsystem 114 may pass an indicator to execution subsystem 118 that authentication has been successful.

Execution subsystem 118 may include software components, hardware components, or a combination of both. For example, execution subsystem 118 may have software components for transmitting commands to perform actions (e.g., unlock access doors, trigger purchase transactions, etc.). Execution subsystem 118 may use one or more processors and/or memory to perform operations. Thus, execution subsystem 118 may execute, after authentication, the first request and subsequently the second request.

In some embodiments, execution subsystem 118 may transmit (e.g., via communication subsystem 112), to a requestor device, a message indicating that the temporal unlock flag has been set. The message may include a command to transmit authentication data for the first authentication mechanism and not for the second authentication mechanism. For example, a requestor device (e.g., one of requestor devices 108a-108n) may be a transaction card (e.g., a credit card). By default, the transaction card may be transmitting both chip authentication (e.g., a first authentication token) and fingerprint authentication (e.g., a second transaction token). Based on the message, the transaction card may be programmed to not transmit the fingerprint authentication until such a time when fingerprint authentication is requested again. In another example, an access card (e.g., for accessing doors) may be programmed to not require additional authentication after the first authentication mechanism is successful.

In some embodiments, authentication system 102 may remove the temporal unlock flags from the user records. For example, the multi-tier authentication subsystem 114 may determine that a temporal unlock flag is set on a particular user record. When a request associated with the user record is received, multi-tier authentication subsystem 114 may retrieve the data associated with the temporal unlock flag. Multi-tier authentication subsystem 114 may determine whether the temporal flag has expired based on the time within the entry. If the temporal unlock flag has not expired, multi-tier authentication subsystem 114 may proceed with the process as described above. However, if the temporal unlock flag has expired, multi-tier authentication subsystem 114 may request additional authentication (e.g., fingerprint or retina scan) and remove the temporal unlock flag from the user record. For example, multi-tier authentication subsystem 114 may erase the category from the record (e.g., the record illustrated in FIG. 2).

Authentication system 102 may receive, after removing the temporal unlock flag from the user record, a third request that includes third authentication data. The third authentication data may be determined as associated with the user record. Based on determining that the temporal unlock flag is not within the user record, multi-tier authentication subsystem 114 may use or request both the first authentication mechanism and the second authentication mechanism (e.g., as described above).

In some embodiments, as described above, each user record may have multiple associated temporal unlock flags. Thus, authentication system 102 may determine (e.g., as described above) that the second request corresponds to a third entity associated with a second category. For example, another request may be from a different merchant associated with a different category. If the user is spending the day in a theme park, the user may have a temporal unlock flag for merchants within the theme park and secondary authentication may not be required for those merchants. However, if a user makes a purchase not associated with the theme park (e.g., outside the theme park), authentication system 102 may require two tiers of authentication and may add to the user record (e.g., as illustrated in FIG. 2) another temporal unlock flag for another category. Thus, based on determining that the second request corresponds to the third entity associated with the second category, authentication system 102 may authenticate the second request using both the first authentication mechanism and the second authentication mechanism. In addition, authentication system 102 may insert, as described above, an additional temporal unlock flag into the user record indicating that the second authentication mechanism is not required for requests associated with the second category for another predetermined amount of time.

Computing Environment

Figure 5:
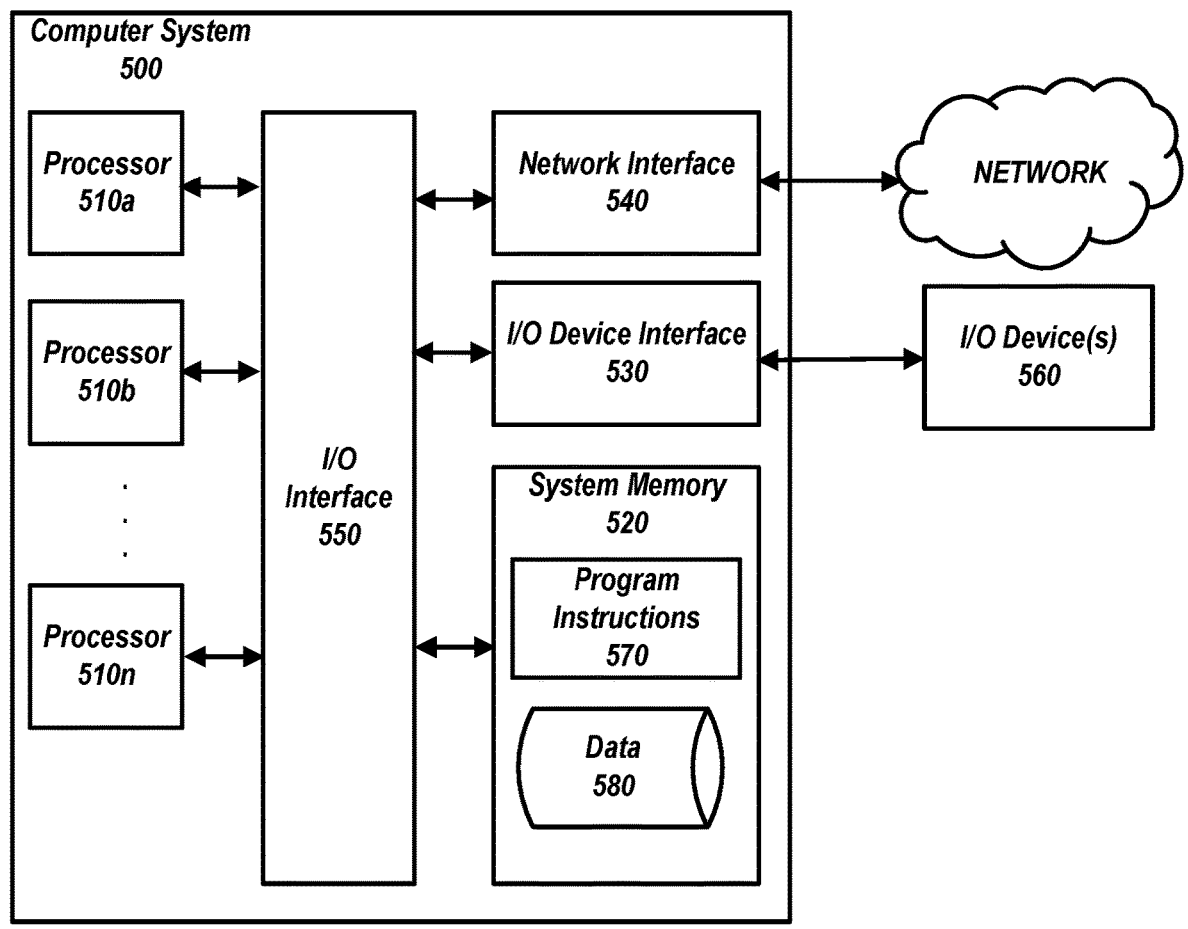
FIG. 5 shows an example computing system that may be used in accordance with one or more embodiments.

FIG. 5 shows an example computing system that may be used in accordance with some embodiments of this disclosure. In some instances, computing system 500 is referred to as a computer system. A person skilled in the art would understand that those terms may be used interchangeably. The components of FIG. 5 may be used to perform some or all operations discussed in relation to FIGS. 1-4. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510a), or a multi-processor system including any number of suitable processors (e.g., processors 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and a network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site, or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. A non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 520 may include a non-transitory computer readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500, or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative, and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated, or may operate as a stand-alone system. In addition, the functionality provided by the illustrated components may, in some embodiments, be combined in fewer components, or be distributed in additional components. Similarly, in some embodiments, the functionality of some of the illustrated components may not be provided, or other additional functionality may be available.

Operation Flow

Figure 6:
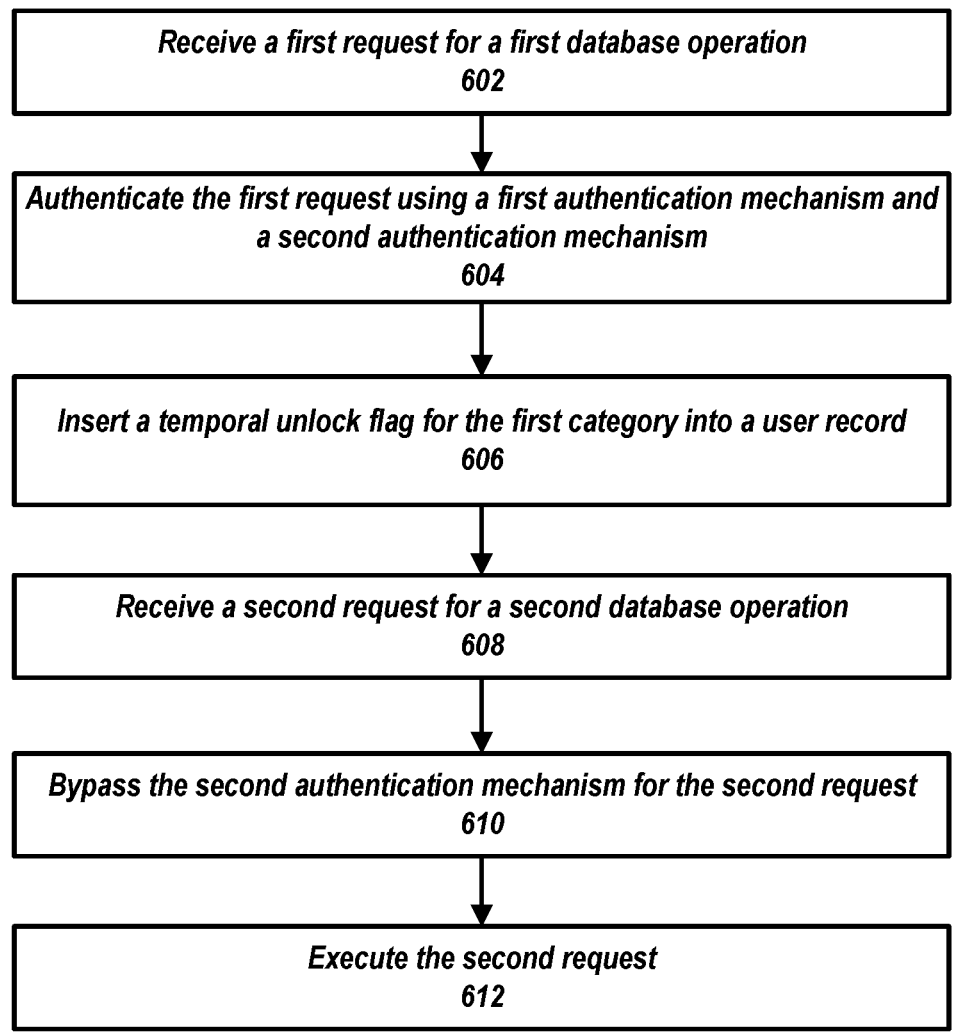
FIG. 6 is a flowchart of operations for bypassing secondary authentication for particular security categories, in accordance with one or more embodiments.

FIG. 6 is a flowchart 600 of operations for bypassing secondary authentication for particular security categories. The operations of FIG. 6 may use components described in relation to FIG. 5. In some embodiments, authentication system 102 may include one or more components of computer system 500. At 602, authentication system 102 receives a first request for a first database operation. For example, authentication system 102 may receive the first request from a data node 104 from one of requestor devices 108a-108n, and/or from other data sources. Authentication system 102 may receive the first request over network 150 using network interface 540.

At 604, authentication system 102 authenticates the first request using a first authentication mechanism and a second authentication mechanism. Authentication system 102 may use one or more processors 510a, 510b, and/or 510n and system memory 520 to perform this operation. At 606, authentication system 102 inserts a temporal unlock flag for the first category into a user record. For example, authentication system 102 may, using one or more processors 510a-510n, insert the temporal unlock flag. In some embodiments, authentication system 102 may insert the temporal unlock flag into a database that is hosted, for example, on data node 104 using network interface 540 through a network (e.g., network 150). At 608, authentication system 102 receives a second request for a second database operation. For example, authentication system 102 may receive the second request from a data node 104 from one of requestor devices 108a-108n, and/or from other data sources. Authentication system 102 may receive the second request over network 150 using network interface 540.

At 610, authentication system 102 bypasses the second authentication mechanism for the second request. Authentication system 102 may use one or more processors 510a, 510b, and/or 510n to perform this operation. At 612, authentication system 102 executes the second request. Authentication system 102 may use one or more processors (e.g., processor 510a) to perform this operation.

Although the present invention has been described in detail for the purpose of illustration based on what is currently considered to be the most practical and preferred embodiments, it is to be understood that such detail is solely for that purpose, and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for bypassing secondary authentication for particular security categories, the method comprising: receiving a first request for a first database operation, the first request comprising first authentication data for a user and an indication of a first category; authenticating, based on the first authentication data, the first request using a first authentication mechanism and a second authentication mechanism; based on authenticating the first request, inserting a temporal unlock flag for the first category into a user record, the temporal unlock flag indicating that the second authentication mechanism is not required for a predetermined amount of time for requests associated with the first category; receiving a second request for a second database operation, the second request comprising second authentication data for the user; based on determining that the second request is associated with the first category and the temporal unlock flag is set, bypassing the second authentication mechanism for the second request; and executing the second request.

2. Any of the proceeding embodiments, wherein the first authentication data comprises a first authentication token for the first authentication mechanism and a second authentication token for the second authentication mechanism, and wherein the first request, when authenticated, causes performance of a first action in relation to a first entity record within a database, and wherein the first entity record comprises a field indicating the first category.

3. Any of the proceeding embodiments, wherein authenticating the first request comprises authenticating the first authentication token using the first authentication mechanism and authenticating the second authentication token using the second authentication mechanism.

4. Any of the proceeding embodiments, further comprising: determining that the predetermined amount of time has passed; removing the temporal unlock flag from the user record;

receiving, after removing the temporal unlock flag from the user record, a third request comprising third authentication data, wherein the third authentication data is associated with the user record; and based on determining that the temporal unlock flag is not within the user record, using both the first authentication mechanism and the second authentication mechanism.

5. Any of the proceeding embodiments, further comprising: determining that the second request corresponds to a third entity associated with a second category; based on determining that the second request corresponds to the third entity associated with the second category, authenticating the second request using both the first authentication mechanism and the second authentication mechanism; and inserting an additional temporal unlock flag into the user record indicating that the second authentication mechanism is not required for requests associated with the second category for another predetermined amount of time.

6. Any of the proceeding embodiments, wherein inserting the temporal unlock flag for the first category into the user record: retrieving, from a category repository, metadata associated with the first category; determining the predetermined amount of time based on the metadata associated with the first category; and generating the temporal unlock flag comprising the first category and the predetermined amount of time.

7. Any of the proceeding embodiments, wherein bypassing the second authentication mechanism for the second request comprises: extracting a user record identifier and an entity record identifier from the second request; retrieving an entity category from an entity record corresponding to the entity record identifier; retrieving, from the user record and based on the user record identifier, one or more categories with associated unlock flags; and based on determining that the entity category matches a category of the one or more categories with the associated unlock flags, authenticating the second request using the first authentication mechanism without using the second authentication mechanism.

8. Any of the proceeding embodiments, further comprising transmitting, to a requestor device, a message indicating that the temporal unlock flag has been set, wherein the message comprises a command to transmit authentication data for the first authentication mechanism and not for the second authentication mechanism.

9. A tangible, non-transitory, machine-readable medium storing instructions that, when executed by a data processing apparatus, cause the data processing apparatus to perform operations comprising those of any of embodiments 1-8.

0. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A method for bypassing additional authentication for particular security categories, the method comprising:
receiving a first request for a first database operation, the first request comprising first authentication data for a user corresponding to a user record and an indication of a first category;
authenticating, based on the first authentication data, the first request using a first authentication mechanism and a second authentication mechanism;
based on authenticating the first request, inserting a temporal unlock flag for the first category into the user record, the temporal unlock flag indicating that the second authentication mechanism is not required for a predetermined amount of time for requests associated with the first category;
receiving a second request for a second database operation, the second request comprising second authentication data for the user;
based on determining that the second request is associated with the first category and the temporal unlock flag is set, bypassing the second authentication mechanism for the second request; and
executing the second request.

2. The method of claim 1, wherein the first authentication data comprises a first authentication token for the first authentication mechanism and a second authentication token for the second authentication mechanism, and wherein the first request, when authenticated, causes performance of a first action in relation to a first entity record within a database, and wherein the first entity record comprises a field indicating the first category.

3. The method of claim 2, wherein authenticating the first request comprises authenticating the first authentication token using the first authentication mechanism and authenticating the second authentication token using the second authentication mechanism.

4. The method of claim 1, further comprising:
determining that the predetermined amount of time has passed; removing the temporal unlock flag from the user record;
receiving, after removing the temporal unlock flag from the user record, a third request comprising third authentication data, wherein the third authentication data is associated with the user record; and
based on determining that the temporal unlock flag is not within the user record, using both the first authentication mechanism and the second authentication mechanism.

5. The method of claim 1, wherein the predetermined amount of time is a first predetermined amount of time, further comprising:
determining that the second request corresponds to a third entity associated with a second category;
based on determining that the second request corresponds to the third entity associated with the second category, authenticating the second request using both the first authentication mechanism and the second authentication mechanism; and
inserting an additional temporal unlock flag into the user record indicating that the second authentication mechanism is not required for requests associated with the second category for a second predetermined amount of time.

6. The method of claim 1, wherein inserting the temporal unlock flag for the first category into the user record comprises:
retrieving, from a category repository, metadata associated with the first category; determining the predetermined amount of time based on the metadata associated with the first category; and
generating the temporal unlock flag comprising the first category and the predetermined amount of time.

7. The method of claim 1, wherein bypassing the second authentication mechanism for the second request comprises:
extracting a user record identifier and an entity record identifier from the second request;

retrieving an entity category from an entity record corresponding to the entity record identifier;
retrieving, from the user record and based on the user record identifier, one or more categories with associated unlock flags; and
based on determining that the entity category matches a category of the one or more categories with the associated unlock flags, authenticating the second request using the first authentication mechanism without using the second authentication mechanism.

8. The method of claim 1, further comprising transmitting, to a requestor device, a message indicating that the temporal unlock flag has been set, wherein the message comprises a command to transmit authentication data for the first authentication mechanism and not for the second authentication mechanism.

9. A system for bypassing secondary authentication for particular security categories, the system comprising:
one or more processors; and
a non-transitory, computer-readable storage medium that stores instructions, which when executed by the one or more processors, cause the one or more processors to perform operations comprising:
receiving a first request for a first database operation, the first request including first authentication data comprising a first authentication token for a first authentication mechanism and a second authentication token for a second authentication mechanism, wherein the first database operation is associated with a first entity record comprising a field indicating a first category;
authenticating and executing the first request based on the first authentication token and the second authentication token;
based on authenticating the first request, inserting a temporal unlock flag into a user record indicating that the second authentication mechanism is not required for a predetermined amount of time for requests corresponding to the first category;
receiving a second request for a second database operation, the second request comprising second authentication data for a user corresponding to the user record;
based on determining that the second request corresponds to a second entity associated with the first category and the temporal unlock flag is set, bypassing the second authentication mechanism for the second request; and
executing the second request.

10. The system of claim 9, wherein the instructions further cause the one or more processors to perform operations comprising:
determining that the predetermined amount of time has passed;
removing the temporal unlock flag from the user record;
receiving, after removing the temporal unlock flag from the user record, a third request comprising a third authentication token, wherein the third authentication token is associated with the user record; and
based on determining that the temporal unlock flag is not within the user record, requesting additional authentication.

11. The system of claim 9, wherein the predetermined amount of time is a first predetermined amount of time, and wherein the instructions further cause the one or more processors to perform operations comprising:
determining that the second request corresponds to a third entity associated with a second category;
based on determining that the second request corresponds to the third entity associated with the second category, authenticating the second request using both the first authentication mechanism and the second authentication mechanism; and
inserting an additional temporal unlock flag into the user record indicating that the second authentication mechanism is not required for requests associated with the second category for a second predetermined amount of time.

12. The system of claim 9, wherein the instructions further cause the one or more processors to perform operations comprising:
retrieving, from a category repository, metadata associated with the first category;
determining the predetermined amount of time based on the metadata associated with the first category.

13. A non-transitory, computer-readable medium storing instructions that, when executed by one or more processors, cause the one or more processors to perform operations comprising:
receiving a first request for a first database operation, the first request comprising first authentication data for a user corresponding to a user record and an indication of a first category;
authenticating, based on the first authentication data, the first request using a first authentication mechanism and a second authentication mechanism;
based on authenticating the first request, inserting a temporal unlock flag for the first category into the user record, the temporal unlock flag indicating that the second authentication mechanism is not required for a predetermined amount of time for requests associated with the first category;
receiving a second request for a second database operation, the second request comprising second authentication data for the user;
based on determining that the second request is associated with the first category and the temporal unlock flag is set, bypassing the second authentication mechanism for the second request; and
executing the second request.

14. The non-transitory, computer-readable medium of claim 13, wherein the first authentication data comprises a first authentication token for the first authentication mechanism and a second authentication token for the second authentication mechanism, and wherein the first request, when authenticated, causes performance of a first action in relation to a first entity record within a database, and wherein the first entity record comprises a field indicating the first category.

15. The non-transitory, computer-readable medium of claim 14, wherein the instructions for authenticating the first request further cause the one or more processors to authenticate the first authentication token using the first authentication mechanism and authenticate the second authentication token using the second authentication mechanism.

16. The non-transitory, computer-readable medium of claim 13, wherein the instructions further cause the one or more processors to perform operations comprising:
determining that the predetermined amount of time has passed; removing the temporal unlock flag from the user record;
receiving, after removing the temporal unlock flag from the user record, a third request comprising third authentication data, wherein the third authentication data is associated with the user record; and based on determining that the temporal unlock flag is not within the user record, using both the first authentication mechanism and the second authentication mechanism.

17. The non-transitory, computer-readable medium of claim 13, wherein the predetermined amount of time is a first predetermined amount of time, and wherein the instructions further cause the one or more processors to perform operations comprising:

determining that the second request corresponds to a third entity associated with a second category;

based on determining that the second request corresponds to the third entity associated with the second category, authenticating the second request using both the first authentication mechanism and the second authentication mechanism; and inserting an additional temporal unlock flag into the user record indicating that the second authentication mechanism is not required for requests associated with the second category for a second predetermined amount of time.

18. The non-transitory, computer-readable medium of claim 13, wherein the instructions for inserting the temporal unlock flag for the first category into the user record further cause the one or more processors to perform operations comprising:

retrieving, from a category repository, metadata associated with the first category; determining the predetermined amount of time based on the metadata associated with the first category; and generating the temporal unlock flag comprising the first category and the predetermined amount of time.

19. The non-transitory, computer-readable medium of claim 13, wherein the instructions for bypassing the second authentication mechanism for the second request further cause the one or more processors to perform operations comprising:

extracting a user record identifier and an entity record identifier from the second request;

retrieving an entity category from an entity record corresponding to the entity record identifier;

retrieving, from the user record and based on the user record identifier, one or more categories with associated unlock flags; and based on determining that the entity category matches a category of the one or more categories with the associated unlock flags, authenticating the second request using the first authentication mechanism without using the second authentication mechanism.

20. The non-transitory, computer-readable medium of claim 13, wherein the instructions further cause the one or more processors to transmit, to a requestor device, a message indicating that the temporal unlock flag has been set, wherein the message comprises a command to transmit authentication data for the first authentication mechanism and not for the second authentication mechanism.

\* \* \* \* \*